Nov. 18, 1958

R. W. GILBERT 2,861,239

CONTROL APPARATUS

Filed Aug. 21, 1956

3 Sheets-Sheet 1

Roswell W. Gilbert
INVENTOR.

BY Rudolph J. Zwick
ATTORNEY

CONTROL APPARATUS

Filed Aug. 21, 1956 3 Sheets-Sheet 2

Roswell W. Gilbert
INVENTOR.

BY Rudolph J. Juick
ATTORNEY

Nov. 18, 1958 R. W. GILBERT 2,861,239

CONTROL APPARATUS

Filed Aug. 21, 1956 3 Sheets-Sheet 3

INVENTOR.
Roswell W. Gilbert
BY
Rudolph J. Juick
ATTORNEY

United States Patent Office 2,861,239

Patented Nov. 18, 1958

2,861,239

CONTROL APPARATUS

Roswell W. Gilbert, Montclair, N. J., assignor, by mesne assignments, to Daystrom, Incorporated, Murray Hill, N. J., a corporation of New Jersey Application August 21, 1956, Serial No. 605,356

3 Claims. (Cl. 323—19)

This invention relates to control apparatus and more particularly to apparatus responsive to deviations of an electrical current or voltage from a predetermined balanced level, and novel means for rendering the system infinitely sensitive during periods when such balanced condition obtains. Similar control apparatus is shown in my co-pending application Serial Number 267,462, filed January 21, 1952, now abandoned; this patent application being a continuation in part of the above mentioned application.

My novel system operates on what may be termed a potential-shift principle and broadly is applicable to any current-balanced feedback arrangement wherein an output current is balanced against an electrical input level that varies in accordance with changes in the condition to be controlled. In its simple form, the system includes a current-balanced degenerative feedback amplifier arranged to amplify the electrical differential between a suitable sensing device and an electrical reference level so that the amplifier input crosses zero as the balance point is crossed. A pair of potential-biased diode elements are connected in parallel across the amplifier output circuit such elements being arranged in opposite sense whereby only one or the other becomes conductive depending upon the directional change in the balanced circuit connected to the amplifier input. In place of the parallel connected potential-biased diode elements, a pair of Zener diode elements arranged in series opposition may be used in parallel across the amplifier output circuit; such series connected Zener diode elements resulting in a circuit which is equivalent to the above-mentioned parallel connected potential-biased diode elements due to the peculiar breakdown characteristics of the Zener diode in the reverse potential region. A current responsive device is actuated by current flow through the diode elements such device indicating changes in the input circuit or initiating a control action to restore the input circuit to a balanced condition. The feed back current to the input circuit becomes zero when the output voltage of the amplifier is less than that required to render the diode elements conductive. Such period of zero feedback occurs when the amplifier input crosses zero, and consequently, at such periods the amplifier has a substantially infinite sensitivity. Since the system is sensitive to zero current it functions with a knife-edge action with no dead zone or region of indeterminacy. Deviations from a true balance condition in the amplifier input circuit result in an amplifier output potential sufficient to render the diode elements conducting thereby reestablishing current flow in the feedback circuit.

An object of this invention is the provision of electrical control apparatus of the current-balanced feedback class and including means for blocking the feedback current when the voltage across the apparatus input circuit is zero.

An object of this invention is the provision of electrical control apparatus responsive to the difference between two electrical levels said apparatus having infinite sensitivity during periods when the difference between the two levels is zero.

An object of this invention is the provision of electrical control apparatus comprising a current-balanced feedback amplifier having an input and an output circuit, a pair of potential-biased diode elements connected in parallel opposition across the amplifier output circuit, and a load device controlled by the potential across such diode elements.

An object of this invention is the provision of electrical control apparatus comprising a current-balanced feedback amplifier, having an input and an output circuit, a pair of Zener diode elements connected in series opposition across the amplifier output circuit, and a load device controlled by the potential across such diode elements.

An object of this invention is the provision of electrical control apparatus comprising a sensing device producing a voltage that varies with changes in the condition to be controlled, an electrical reference source of voltage opposed to the voltage produced by said sensing device, an amplifier responsive to the voltage difference between the sensing device and reference source, said amplifier including a current-balanced feedback loop, a circuit including a pair of potential-biased diode elements connected in parallel-opposition in the feedback loop, and a polarity-sensitive member responsive to the potential across the said circuit.

An object of this invention is the provision of electrical control apparatus comprising a sensing device producing a voltage that varies with changes in the condition to be controlled, an electrical reference source of voltage opposed to the voltage produced by said sensing device, an amplifier responsive to the voltage difference between the sensing device and reference source, said amplifier including a current-balanced feedback loop, a circuit including a pair of Zener diode elements connected in series opposition in the feedback loop, and a polarity-sensitive member responsive to the potential across the said circuit.

These and other objects and advantages will become apparent from the following description when taken with the accompanying drawings. It will be understood the drawings are for purposes of illustration and are not to be construed as defining the scope or limits of the invention, reference being had for the latter purpose to the appended claims.

In the drawings wherein like reference characters denote like parts in the several views.

Figure 1:
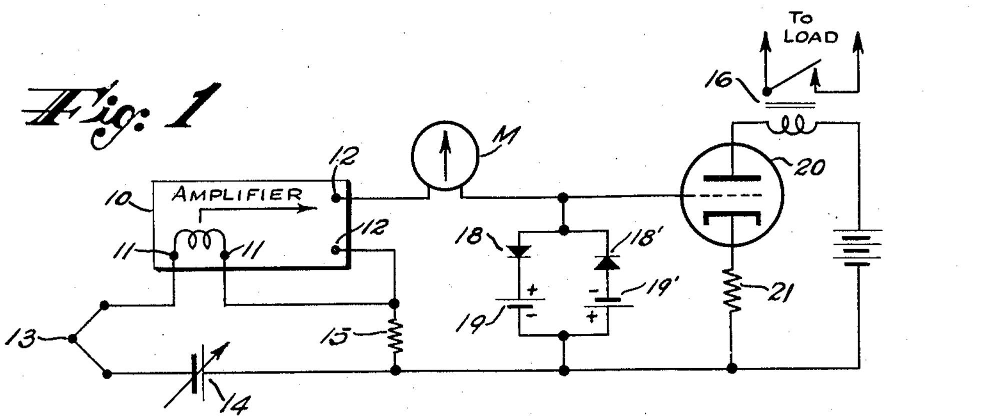
Figure 1 is a schematic diagram illustrating the invention.

Reference is now made to Figure 1 showing an amplifier 10 having input terminals 11 and output terminals 12. The sensing potential is derived from a thermocouple 13 that is inserted into a furnace, temperature bath, or other device, the temperature of which is to be controlled. A source of variable, reference potential 14 is connected to the thermocouple, in opposition, through a feedback resistor 15. The amplifier input terminals are connected into the series circuit comprising the thermocouple 13, reference source 14 and resistor 15, whereby the amplifier responds to the current flowing in such circuit. It is apparent that in such arrangement the amplifier input crosses zero as the control point of the system is crossed. If the heating current for the furnace is controlled by the operation of a suitable power relay 16, the overall sensitivity of the apparatus is a function of the operating adjustment of the relay. In a practical sense, there is a definite limit to the relay adjustment and no matter how close such adjustment there will always exist a finite dead zone or region of indeterminacy. For close control it is, of course, desirable to have the apparatus sensitive to an absolute zero current to produce a knife-edge control action with no dead zone. So far as I am aware such a desirable system did not exist prior to this invention.

It will be noted the amplifier output current is fed back to the input circuit, to provide a current-balanced feed-back system. Any current-balanced feedback system may be utilized in the practice of the invention although I shall describe an amplifier system particularly well suited for the purpose with specific reference to Figure 4. The output circuit of any current-balanced feedback amplifier exhibits a characteristic of infinite resistance because the balancing action controls the output current independently of inserted resistance or potential. Thus, any necessary function causing a potential burden, within functional limits, in the amplifier output circuit will not effect the normal operation of the system. In Figure 1, I have shown a pair of potential biased diode elements 18, 18' connected across the amplifier output, such elements being connected in parallel but in an opposed sense and each element being subjected to an initial potential bias, in the non-conducting direction, by the voltage sources 19, 19', respectively. The elements 18, 18' will pass current only when the amplifier output potential exceeds the bias level of either of the parallel diode branches, that is, no current will flow when the output potential is within the bias region having a range of 5–0–5 volts, in practice. Thus, as the amplifier output current crosses zero, the potential development across the diodes will swing abruptly over the bias potential before any reverse current can flow in the feedback loop. The potential will swing abruptly when the current is so blocked because the normal restrain of degenerative feedback is absent over this region and the full gain of the amplifier is thereby effective. Ideally, this un-degenerated gain is infinite and in a practical sense it is at least very high. Over this blocked-current region the amplifier delivers voltage only. Thus, under this condition, the amplifier has what may be termed a pure potential burden (in the sense that a burden, broadly, is any delivered magnitude and not necessarily only delivered power). Consequently, such potential swing of the amplifier has no objectionable influence upon the amplifier output. These potential swings are applied to a buffer or amplifier tube 20 for operation of the control relay 16. The cathode resistor 21, of the tube 20, is selected so that at zero grid potential, relative to the negative battery lead, the relay 16 is midway between its pull-in and drop-out current levels. The relay will then operate either way with a relative grid excursion of about 1.5 volts in the respective direction. This is well within the potential-shift region of 5 volts to either side of zero. The relay need only operate to both pull-in and drop-out within the potential-shift region from which it is apparent that the circuit adjustments are not critical. In effect, the amplifier develops an infinite sensitivity over the region of the potential swing because during such period the normal degeneration feedback is blocked by the diode bias. Within the swing region, the blocked diodes have substantially infinite resistance and the potential swing obtains upon a substantially infinitesimal increment of input current change about absolute zero.

Figures 2, 3:
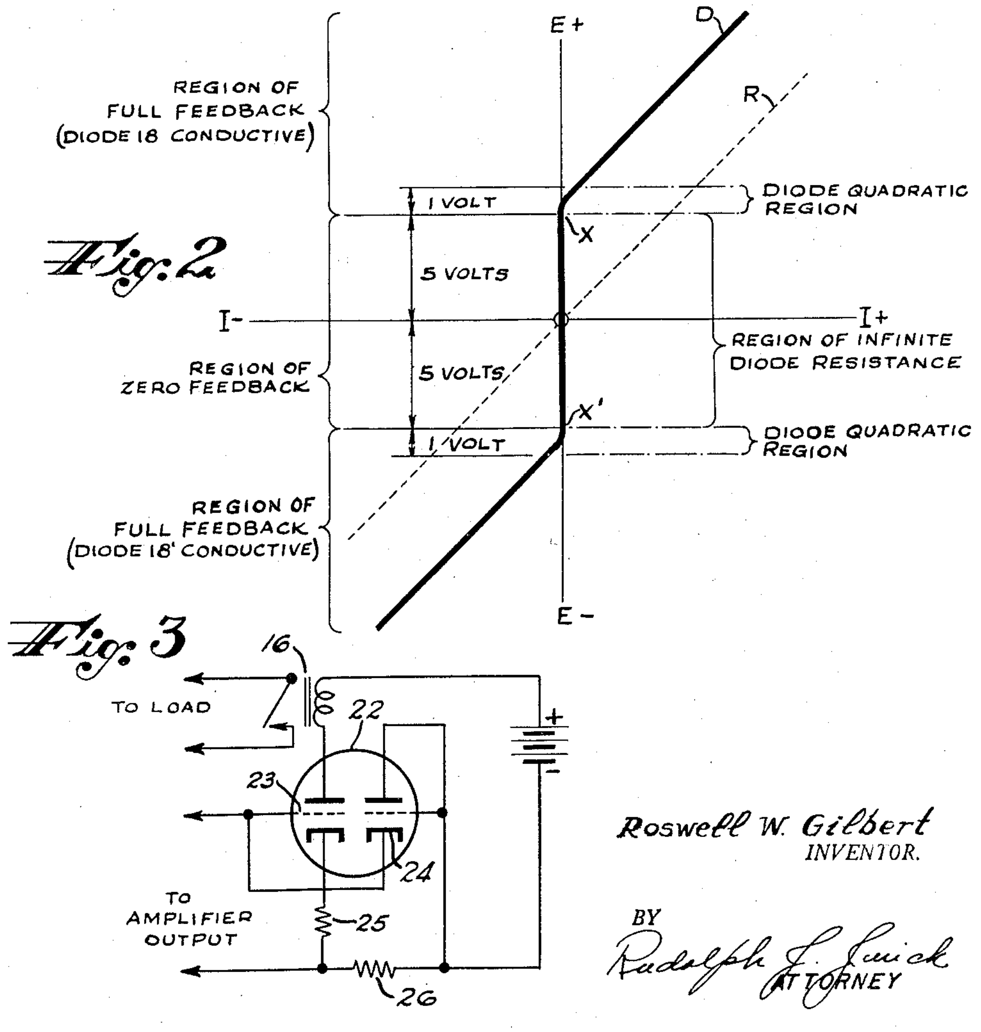
Figure 2 is a curve illustrating the variation in potential across the potential-biased diode elements, in response to amplifier output current changes.
Figure 3 is a circuit diagram of a practical embodiment of the invention adapted for control purposes.

Reference is now made to Figure 2 for a further explanation of the action of the diodes. The straight-line, dotted curve R represents the change in current flow through a simple resistance upon changes in the applied potential. The solid curve D represents the voltage appearing across the diode circuit in response to amplifier output current. It will be noted that the current flow through one diode decreases proportionally with a decrease in the positive (+) voltage until such voltage drops to the point X, at which point the current flow is zero, the point X corresponding to the diode bias potential. Current flow through the other diode does not take place until the voltage impressed thereacross reaches the point X', after which current flow is again proportional to increased potential. The region between the points X, and X' is that region wherein the diodes have substantially infinite resistance (the voltage range of this region being 10 volts, as shown), and in this region there is zero feed-back to the amplifier input circuit, whereupon the amplifier operates at infinite sensitivity. However, when the amplifier voltage exceeds the potential bias of the diodes (specifically, greater than +5 or −5 volts in the example under discussion), one or the other of the diodes becomes conductive. Such diode, current-conducting regions are designated as Region of Full Feedback on the curve of Figure 2. Within the relatively narrow (one volt excursion) regions designated as Diode Quadratic Region, the current flow through the diodes is substantially proportional to the square of the voltage above the bias level. It will now be clear that as the amplifier output current crosses zero (in response to a similar cross-over between the two, opposed, input potentials) the potential developed across the diodes must swing abruptly beyond the normal potential bias of the diodes, before any reverse current can flow in the amplifier feedback loop. Inasmuch as the amplifier is opened to infinite gain during such potential swing periods, its input sensitivity is substantially infinite whereby the system operates on a knife-edge principle with absolutely no dead zone. Once the amplifier has responded to such infinitesimal current unbalance (to either side of absolute zero) the diodes become conductive whereby the current feedback circuit takes effect. It may here be pointed out that the technique of infinite gain is rather new in the art but is being recognized as useful in degenerated amplifiers. In general, infinite gain is obtained by internal regenerative feedback to a point where, without degeneration, the system would be on the verge of oscillation or fallover. The system, thus, is only stable when subsequently degenerated. Also, infinite gain may be obtained in a frequency-shift system, by a flat-topped impedance characteristic adjustment, as described in my copending United States patent application Serial No. 267,463, filed January 21, 1952, now Patent No. 2,744,168 and entitled "D.-C. Amplifier." Actually, the exact condition of infinite gain is an adjustment ideal which can, of course, only be approached by practical adjustment or design, within limits.

Having now described the principle of operation of my novel system, reference is made to Figure 3 for a practical circuit. The diodes 18, 18' of Figure 1 are here replaced by a dual triode tube 22, the left section of the tube being employed as one of the diodes and as a control for the power relay 16, and the right section of the tube constituting the other diode. The tube sections are connected in parallel-opposed sense across the amplifier output circuit. When the amplifier output current is of one polarity the grid 23 swings positive and becomes conducting and with a reversed current polarity the cathode 24 swings negative to become conducting. The biasing potentials for the two tube sections are developed by the cathode resistor 25 and the plate resistor 26. The coil of the power relay 16 is connected into the plate circuit, as shown, and the relay is adjusted to operate at a median level of plate current. Thus, when the output potential of the amplifier exceeds the normal blocking potentials on the tube 22 and is of one polarity, the relay 16 will close its contacts to complete the electrical circuit as, for example, to the heating coils in a temperature bath. When the amplifier potential is of similar magnitude but reversed polarity, the relay will open its contacts thereby disconnecting the heating circuit. By properly relating the sense of current unbalance at the amplifier input to the operation of the power relay contacts, the system will control temperature to a degree of accuracy heretofore not possible in commercial equipment.

In a typical case the tube 22 is a Type 6SN7 and the relay 16 has a coil resistance of approximately 6,000 ohms, a pull-in current of about 6 milliamperes and a drop-out current of about 4 milliamperes. With the amplifier output terminals at zero potential (short-circuited) the cathode resistor 25 is adjusted to give an approximate medium value of plate current, 5 milliamperes. Potential is then applied to the amplifier output terminals, positive (+) with respect to the grid 23, and raised until a current demand is noted. This will occur at about +5 volts. The applied potential is then reversed and resistor 26 is adjusted until a comparable order of current is observed. This current is now negative (−) and flows through the cathode 24 rather than grid 23. The relay 16 will now drop-out and pull-in at output potentials of about 1.5 volts, respectively negative (−) and positive (+) with respect to the grid 23, and at about 5 volts in either polarity the circuit will pass current. The circuit values are not critical and the adjustments, herein mentioned, are to determine the design values of the resistors which are then fixed with a tolerance of ±20 percent. The only prime requirement is that the relay 16 operate at values of applied voltage lower than that required to draw current.

Referring back, for the moment, to Figure 1, the feedback through the mutual resistor 15 is degenerative, i. e., a change of output current causes a feedback potential, in the input circuit, to oppose the output change. The actual value of the resistor 15 is a function of the input range of potential and the range of output current. Typically, the output current would have a range of 1 milliampere, as indicated by the instrument M, and the resistor 15 would thereby have a value of 1 ohm per millivolt of input range.

The arrangement, described above, will operate over an amplifier output potential swing of about 6 volts overall. Since it is easily possible to provide a current-balanced feedback amplifier which can support an output burden of 60 volts, the potential burden imposed by the accessory relay circuit is not appreciable. The grid-current demand in the negative grid region, where a current block is required, is normally less than 0.1 microampere and is insignificant with respect to a convenient range of amplifier current-output level of, say, 1 milliampere. An important advantage of my novel system is the absence of any adverse effect, due to the addition of the diode-relay system into the amplifier output circuit, upon the normal function of measurement. This allows simultaneous monitoring of the control operation by means of an electrical indicating instrument or a recorder, such instrument M being shown in the schematic circuit of Figure 1. The knife-edge action provides a control sensitivity to the full resolution sensitivity of the system regardless of how high the indicating or operating range of the device. For example, an indicating range of 50 millivolts is perfectly consistent with a control sensitivity of 5 microvolts; a resolution sensitivity of 10,000.

Figure 4:
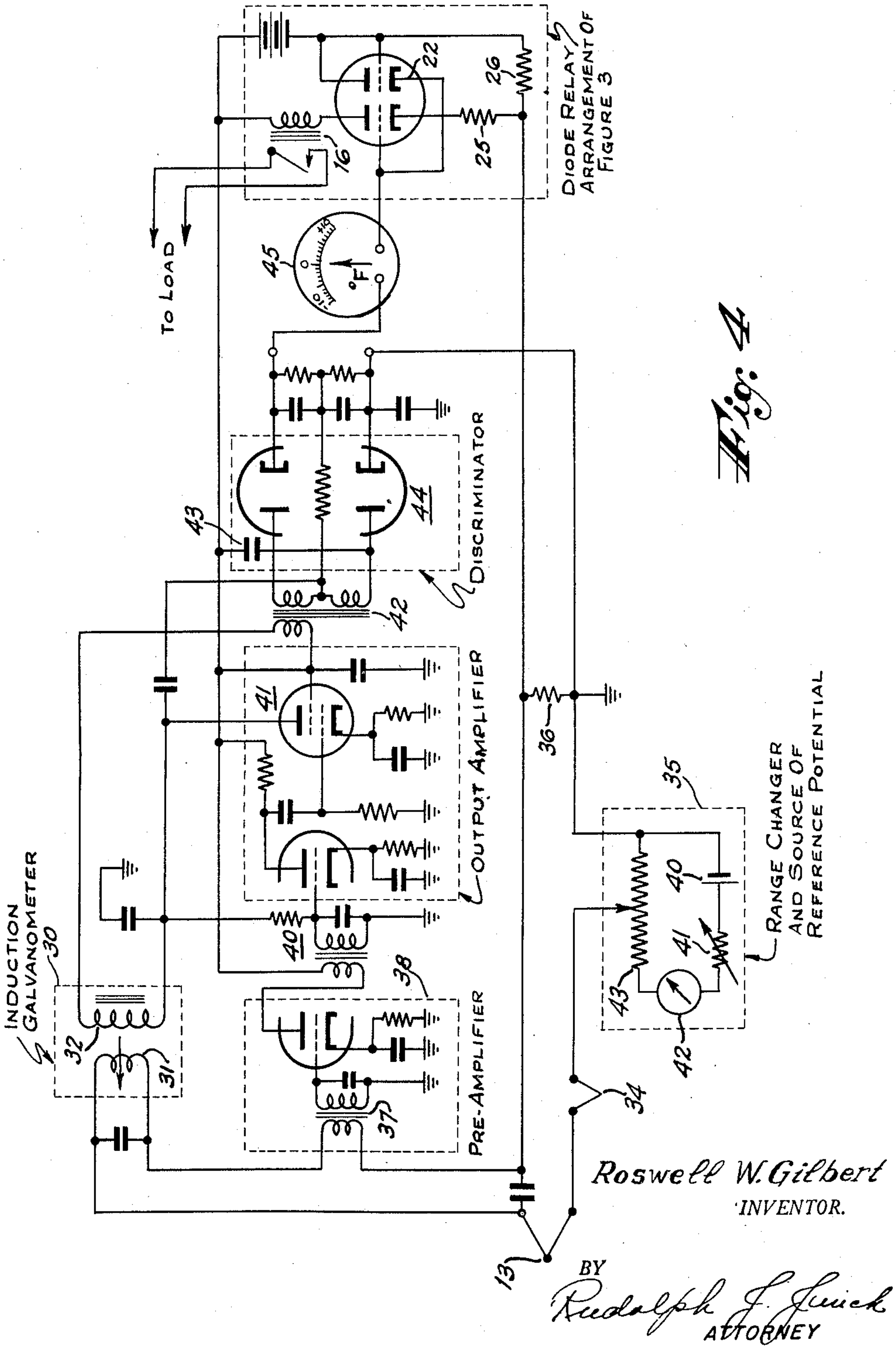
Figure 4 is a wiring diagram of a complete system for indicating and controlling temperature changes.

Reference is now made to Figure 4 which is a circuit diagram of a complete indicator-controller made in accordance with my invention and designed for close temperature control at a selected level. It is here pointed out that in Figure 4 the induction galvanometer 30, pre-amplifier 38, output amplifier 41 and discriminator 44 constitute the components of the D.-C. amplifier as represented by the block 10 in Figure 1. It will again be assumed the thermocouple 13 is inserted into a fluid bath that is to be maintained at a selected temperature level and that electrical heating coils constitute the output load of the apparatus. The amplifier input circuit comprises an induction galvanometer 30 which, essentially, is a sensitive D.-C. to A.-C. converter having an advantage of high operating frequency, into the megacycle region if desired. Such device is described in detail in my United States Patent No. 2,486,641, issued November 1, 1949. For present purposes it may be stated the induction galvanometer is a permanent magnet, movable coil structure including means for injecting an A.-C. component of magnetic flux into the permanent field flux path. When the movable coil 31 is in the normal center-zero position the flux linkage between such coil and the A.-C. field coil 32 is zero. Pivotal deflection of the movable coil, in response to a D.-C. current, will produce an A.-C. potential across the coil which can be extracted by the external circuit for amplification. Thus, in the illustrated circuit, the movable coil 31 forms a series circuit with the sensing thermocouple 13, the cold junction point 34, the source of reference current 35, the feedback resistor 36 and the input transformer 37 of the pre-amplifier stage 38. The source of reference current 35 is of conventional design and may include a standard voltage source 40, a variable resistor 41, an indicating instrument 42 and the potentiometer 43. The potentiometer slider may be associated with a suitable scale calibrated in temperature values related to the characteristics of the particular thermocouple. Thus, the potentiometer slider can be set to a desired temperature value and the temperature at the thermocouple will correspond to the selected temperature when the current generated by such thermocouple balances the current flowing in the series circuit as a result of the output potential of the potentiometer. When such current balance obtains the movable coil 31 of the induction galvanometer 30 is at its normal, zero-center position. When the circuit becomes unbalanced, in either direction, the movable coil 31 deflects and an A.-C. potential is induced therein such potential having a magnitude and phase-direction proportional to the degree and direction of deflection. Of necessity, the connected external circuit presents an effective A.-C. impedance across the movable coil and an A.-C. component of current will circulate through the coil causing a reaction with the A.-C. component of the field flux. The induced potential is in quadrature with the field flux, and the useful movable coil output appears in quadrature to the excitation resulting in a frequency shift in the circuit of the field coil 32. The novel circuit operating on the frequency-shift principle here under discussion is the subject matter of my co-pending United States patent application Serial No. 267,463 filed January 21, 1952. For present purposes it is sufficient to state that the A.-C. voltage induced in the movable coil 31, of the induction galvanometer, is introduced into the input transformer 37 of the pre-amplifier stage, comprising one half of the dual triode 40, and is amplified by the output amplifier comprising the other half of the triode 40 and a power pentode 41 arranged in cascade. A discriminator is coupled to the output of the amplifier through a coupling transformer 42 having its primary winding in series with the field coil 32 of the induction galvanometer which phases the discriminator properly. The discriminator is of a conventional, balanced type as commonly used in radio practice and is phased by the condenser 43 connected to the amplifier output stage plate. Thus, the D.-C. output of the discriminator dual diode rectifier tube 44 is balanced at the center frrequency (that is, the circuit frequency when the movable coil 31 of the induction galvanometer is in its normal, zero-center position) and is polarized with respect to frequency-shift as the galvanometer movable coil deflects.

The D.-V. output of the discriminator is fed back to the input circuit through the resistor 36, through the indicating instrument 45 and the diode relay arrangement, the latter having been described hereinabove with reference to Figure 3. Thus, any change in the current generated by the thermocouple 13 results in a corresponding deflection of the instrument pointer and the operation of the power relay 16 for control of the heating current. The knife-edge action of the apparatus provides a control sensitivity to the full resolution sensitivity of the system regardless of indicating range. As has been stated above, an indicating range of 50 millivolts is perfectly consistent with a control sensitivity of 5 microvolts.

Figure 5:
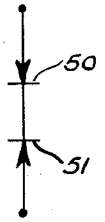
Figure 5 is a schematic diagram of a pair of Zener diode elements connected in series opposition, which diodes may be used in place of the pair of potential-biased diode elements in Figure 1.

Reference is now made to Figure 5 wherein there is shown a pair of Zener diode elements 50 and 51 which are connected in series opposition. The two series connected Zener diode elements as shown in Figure 5 may be used in place of the potential biased diode elements 18, 18' which are connected in parallel and in the opposed sense, and the reverse potential bias voltage sources 19, 19'.

Figure 6:
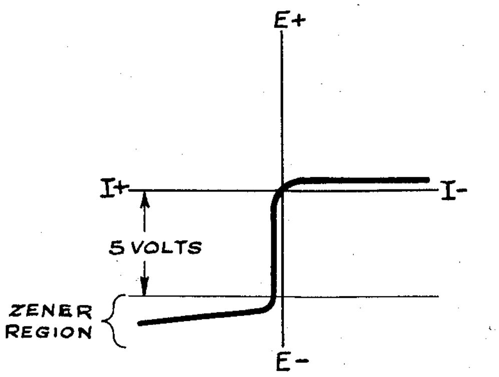
Figure 6 is a current-voltage characteristic curve of a single Zener diode element.

A typical Zener diode element comprises a diffused junction silicon diode element which, in the forward region, conducts as a normal diode element. The Zener diode element, however, includes within itself an intrinsic biasing potential which appears as a characteristic level of break-down in the reverse region. Figure 6 is a current-voltage characteristic curve of a single Zener diode element and clearly shows the Zener effect in the reverse region. Note that in the forward region the diode conducts as the usual diode. In the area marked Zener Region the Zener diode element develops a very low differential resistance, and a voltage drop that is substantially a constant regardless of the reverse current. The voltage level at which this occurs is termed the Zener voltage and for use in the apparatus described above Zener diode elements exhibiting a Zener voltage of 5 volts are chosen. Zener diode elements may be operated in the Zener region to the full limit of temperature rise without adverse effect.

Figure 7:
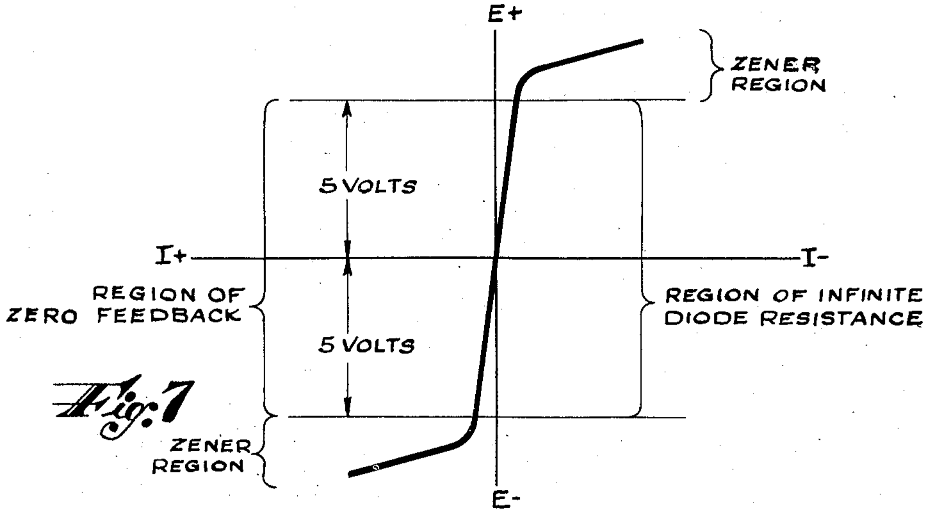
Figure 7 is a curve illustrating the variation in a potential across the series connected Zener diode elements, in response to amplifier output current changes.

Reference is now made to Figure 7 of the drawings wherein there is shown a curve illustrating the variation in potential across the series connected Zener diode elements, in response to amplifier output current changes. The Zener diode elements are connected in series opposition (as shown in Figure 5 of the drawings, for example) and are used in place of the parallel connected diode elements 18, 18' and, respective bias potential sources 19, 19', as shown in Figure 1. As described above, a single Zener diode element differs from a normal diode with a series biasing potential in that the bias appears as a reverse break-down rather than a raised forward level of conductance. Therefore, a pair of Zener diode elements 50, 51 (Figure 5) connected in series opposition is equivalent to the conventional diode elements 18, 18' which are connected in parallel and biased by bias voltage sources 19, 19', respectively (see Figure 1). As seen in Figure 7, the series connected Zener diode elements develop a volt-ampere characteristic which is required by the apparatus of this invention and which is substantially the same as that shown in Figure 2 of the drawings. The apparatus of this invention functions equally well with the series connected Zener diode elements of Figure 5, or the ordinary type diodes which are connected in parallel and supplied with a biasing voltage, as shown in Figure 1.

While I have described my invention with detailed reference to a specific apparatus for the simultaneous indication and control of a varying temperature, it will be apparent the system is adapted for use in any application wherein a changing condition can be converted into corresponding electrical quantities. Those skilled in this art will be able to make numerous changes and modifications in the specific, disclosed apparatus, to meet required conditions with respect to specific applications. It is intended that such changes and modifications fall within the spirit and scope of the invention as set forth in the following claims.

I claim:

1. Control apparatus comprising a sensing member which develops a D.-C. potential that varies in magnitude with changes in a variable condition to be controlled; a reference source of D.-C. potential having a predetermined level and connected in opposition to the potential produced by the said sensing member; a direct current amplifier having an input energized by the potential difference between the reference source and the sensing member, the said amplifier producing a D.-C. current output that varies in polarity sense with the directional unbalance between the potentials of the reference source and the sensing member; a D.-C. conductive degenerative feedback circuit connected between the amplifier output and input circuit, said feedback path including a pair of asymmetrically-conducting elements, the said elements being non-conductive until the potential applied thereto exceeds a predetermined value, and polarity-sensitive control means connected in shunt with the said elements, said control means being adapted to bring about changes in the variable condition in a sense to balance the potentials of the sensing member and reference source.

2. Control apparatus comprising a sensing member which develops a D.-C. potential that varies in magnitude with changes in a variable condition to be controlled; a reference source of D.-C. potential having a predetermined level and connected in opposition to the potential produced by said sensing member; a direct current amplifier having an input energized by the potential difference between the reference source and the sensing member, said amplifier producing a D.-C. current output that varies in polarity sense with the directional unbalance between the potentials of the reference source and the sensing member; a D.-C. conductive degenerative feedback circuit connected between the amplifier output and input circuits, said feedback circuit including a pair of asymmetrically-conducting, potential-biased elements connected in parallel but opposed sense and said elements being non-conductive until the potential applied thereto exceeds the biasing potential, and polarity-sensitive control means connected in shunt with said elements, said control means being adapted to bring about changes in the variable condition in a sense to balance the potentials of the sensing member and reference source.

3. Control apparatus comprising a sensing member which develops a D.-C. potential that varies in magnitude with changes in a variable condition to be controlled; a reference source of D.-C. potential having a predetermined level and connected in opposition to the potential produced by the said sensing member; a direct current amplifier having an input energized by the potential difference between the reference source and the sensing member; said amplifier producing a D.-C. current output that varies in polarity sense with the directional unbalance between the potentials of the reference source and the sensing member; a D.-C. conductive degenerative feedback circuit connected between the amplifier output and input circuits, said feedback circuit including a pair of Zener diode elements connected in series opposition, the said elements being non-conductive until the potential applied thereto exceeds the Zener diode element Zener voltage, and polarity-sensitive control means connected in shunt with said elements, said control means being adapted to bring about changes in the variable condition in a sense to balance the potentials of the sensing member and reference source.

References Cited in the file of this patent

UNITED STATES PATENTS 2,302,049 Parker et al. ............ Nov. 17, 1942

2,581,124 Moe .................... Jan. 1, 1952

FOREIGN PATENTS 276,762 Switzerland ............ July 31, 1951